July 13, 1954

L. F. HARZA 2,683,354

SEAL FOR HYDRAULIC GATES

Filed July 7, 1952

DIRECTION OF WATER PRESSURE

INVENTOR:
LeROY F. HARZA
BY
ATTORNEY

July 13, 1954　　　　　L. F. HARZA　　　　　2,683,354
SEAL FOR HYDRAULIC GATES
Filed July 7, 1952　　　　　　　　　　　　　　2 Sheets-Sheet 2
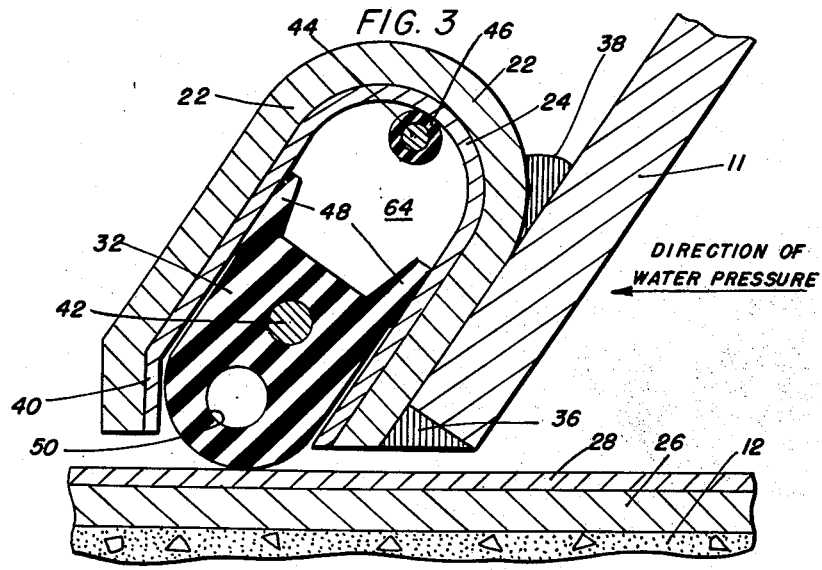
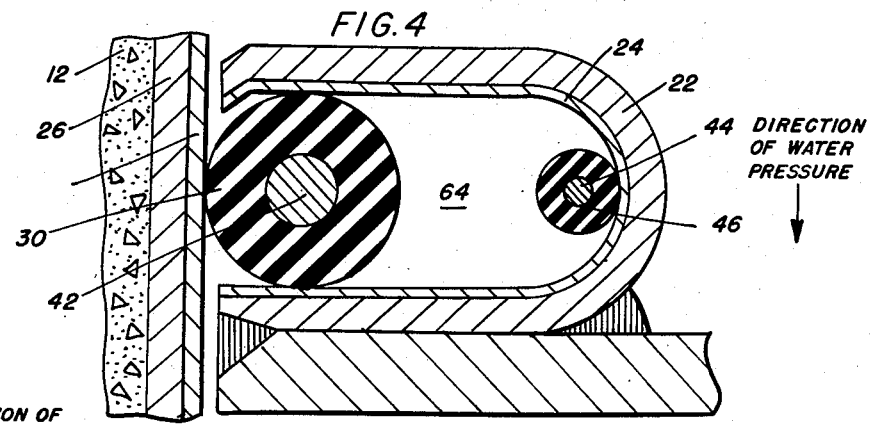
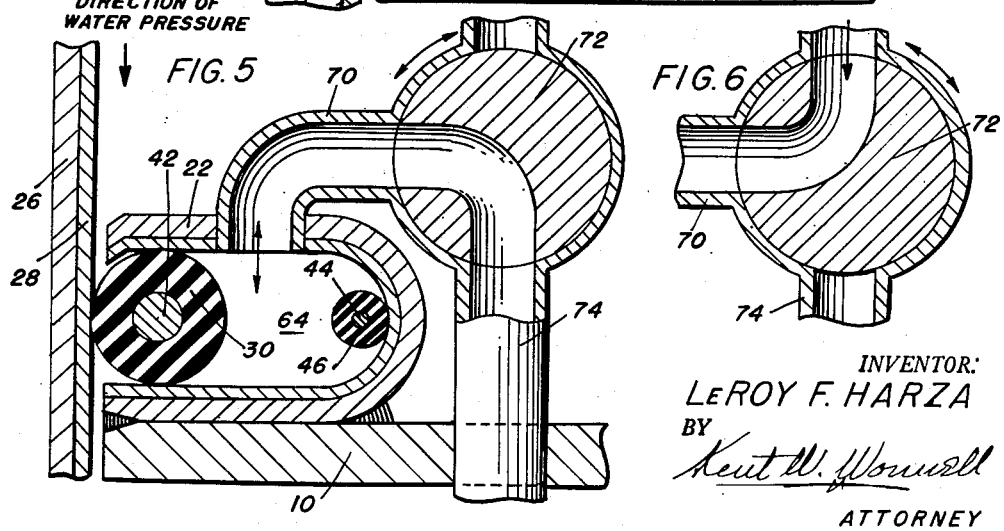
INVENTOR:
LeROY F. HARZA
BY
ATTORNEY

Patented July 13, 1954

2,683,354

UNITED STATES PATENT OFFICE 2,683,354

SEAL FOR HYDRAULIC GATES

Leroy F. Harza, Chicago, Ill.; Fred H. Camphausen and Edward W. Hillier, executors of said Leroy F. Harza, deceased Application July 7, 1952, Serial No. 297,505

12 Claims. (Cl. 61—28)

This invention relates in general to hydraulic gates for dams, water courses, and the like, and is more particularly described as a water seal for gates of this kind. It is quite impossible to build steel gates to exactly fill an opening in a dam and it is likewise impossible to build the contact surfaces of concrete walls and piers so accurately that a gate will exactly fit therein. Moreover the gate itself is especially subject to temperature changes which alter the dimensions. Gates must therefore be made of a size to clear the walls and piers by an amount necessary to allow for irregularities and temperature changes, and this clearance must then be covered by a flexible bridging element which seals the gate against leakage in the dam opening.

An important object of the present invention is to provide a seal in connection with a gate which is movable to close the clearance space between the edges of the gate and the corresponding sides and bottom of the opening.

A further object of the invention is to provide means for applying a flexible seal under pressure to bridge the clearance space between a dam, gate and its opening.

A still further object of the invention is to provide means for utilizing the water pressure of the dam itself to maintain contact of the seal between the gate and the dam opening.

A still further object of the invention is to provide means for reducing or relieving the contact pressure upon the seal while the gate is being raised and lowered.

Still a further object of the invention is to provide a continuous seal which extends on both sides and at the bottom of a dam gate so that it can be made continuous around the lower corners of the gate.

A further object of the invention is to provide a seal for hydraulic gates which is capable of self-adjustment to large irregularities between the gate and the opening.

A further object of the invention is to provide a seal of the class described which is quickly replaceable without loosening a large number of bolts which may have become so rusted as to make it necessary to destroy them and provide new ones.

Still another object of the invention is to provide means for heating the seal to thaw out a frozen gate.

Other objects of the invention will appear in the specification and will be apparent from the accompanying drawings in which, Fig. 1 is an elevational view of a gate mounted in an opening of a dam having abutments at each end;

Fig. 3 is a sectional view illustrating a seal similar to that of Fig. 2 applied to the bottom of an inclined gate either flat or curved;

Fig. 4 is a sectional view showing a seal circular in cross section, in connection with a heating conductor;

Fig. 5 is a sectional view of a circular flexible seal in connection with a valve structure for admitting dam pressure back of the seal and to relieve pressure from this space to the downstream side of the dam gate, the valve represented as being in the latter position; and Fig. 6 is a fragmentary view showing a valve admitting pressure to the seal.

Figure 1:
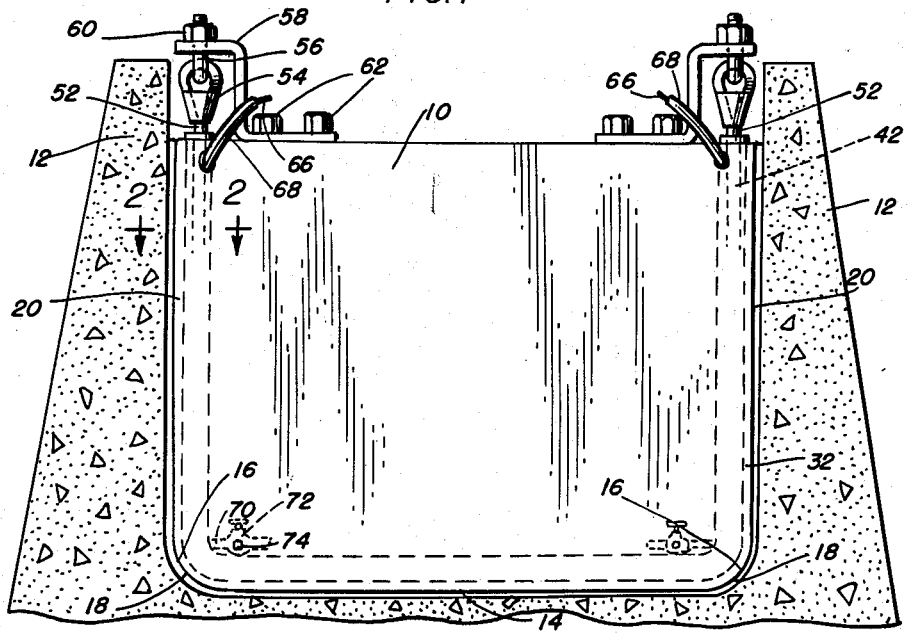

Sometimes the bottom of a gate rests directly upon a steel member embedded in the concrete crest of a dam and made watertight by machining both the bottom edge of the gate and the embedded member to a true line. A seal is desirable, however, and is often used at the bottom as well as the sides because of the expense of machining the parts and the tendency of the machine surfaces to deteriorate by wear, rust and pitting.

Referring now more particularly to the drawings, the whole movable closing structure known as the dam gate has a watertight element comprising a skin plate 10, preferably of metal, which is mounted in a dam opening which has an abutment 12 at each side and a bottom 14 upon which the gate rests. At the lower corners of the skin plate are rounded edges 16 which conform as nearly as possible to correspondingly rounded fillets 18 at the bottom of the wall and abutments. The bottom of the gate and the skin plate may rest more or less closely upon the bottom of the opening, but the sides of the skin plate of the gate fit more or less loosely with a clearance 20 at each side sufficient to allow for irregularities in the gate and abutments and to allow for temperature changes.

Connected to the marginal edge of the sides and bottom of the skin plate 10 is a U-shaped strip 22 of metal preferably having a liner 24 of corrosion-proof metal such as brass, aluminum or stainless steel. The most practical material is the recently available "stainless clad" steel consisting of ordinary steel plate with a stainless steel layer applied in the process of rolling. The open side of the U faces outwardly from the gate and toward the wall of the abutment with sufficient clearance to miss all of the irregularities of the wall surface. In the adjacent surface of the wall or abutment 12, a strip of similar steel plate 26 with a stainless steel layer 28 is embedded flush with the surface of the concrete in the wall or partition and opposite the edge of the gate.

Figure 2:
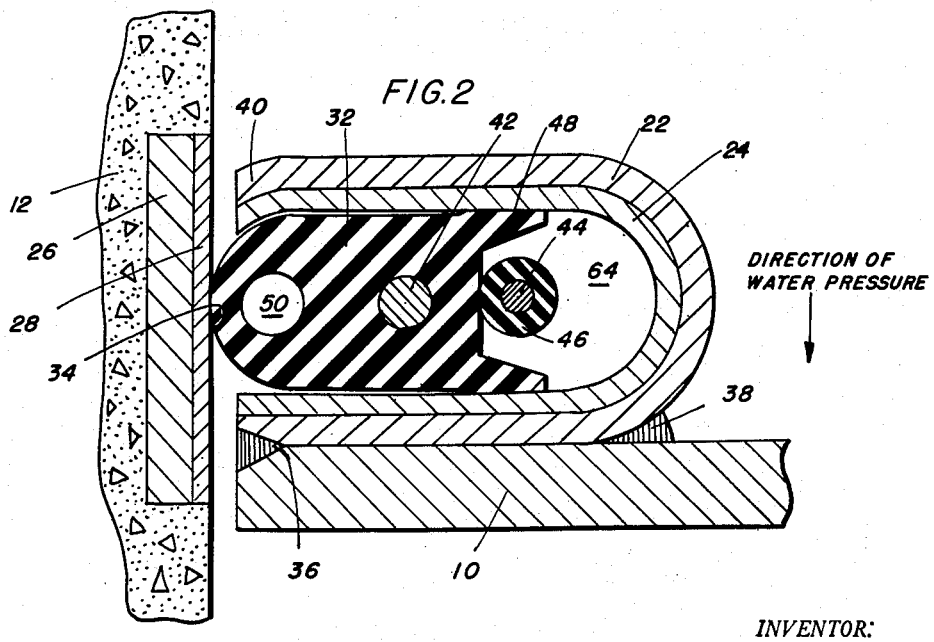
Fig. 2 is a sectional view of one form of an edge seal for the gate.

A flexible seal strip of rubber, plastic or even metal is fitted into the U member and may be a circular strip 30 as shown in Figs. 4 and 5 or a somewhat oblong strip 32 with a projecting rounded end 34 as shown in Figs. 2 and 3, so that the outer rounded surface is adapted to make contact with the inlaid strip in the wall at the edge of the gate. The seal strip fits closely within the arms of the U member and may make an airtight contact therewith when there is pressure within the U member and to permit a limited movement within the U member and to engage the outer rounded surface of the seal against the inlaid strip 26, 28 in the wall. For the circular strips, the best condition is to provide the minimum possible clearance that will prevent friction.

The U strip may be permanently attached to the skin plate 10 of the gate in any suitable manner, preferably by a brazing or a welding fillet 36 flush with the outer edge of the skin plate and a U member and another fillet 38 at the rounded end of the U member which are represented as holding the member tightly in place. In order to hold the seals from falling out of the U member when the gate is raised, the outer free edge is formed with an inward angular bend 40 which thus restricts the U member at its open edge. Either type of sealing strip 30 or 32 may extend continuously at the sides and bottom of the gate and it is supported within the U member by a wire rope cord 42 which extends beyond the upper edge of the gate where it is attached by suitable holders. In the rounded inner portion of the U member for both types of seal, there may be a heating conductor 44 covered with suitable insulation 46.

In the sealing strip 32 which also extends continuously at the sides and bottom of the gate, there are flexible fins 48 at the rear inner edges which fit loosely against the inner parallel sides of the U member and are adapted to be resiliently pressed against the inside surface of the U member by any pressure therein. In the rounded nose of this seal strip, there may be a passage 50 to provide greater resilience in this outer edge of the strip and also to provide a passageway for heating water if desired. Also extending through this seal strip is a wire rope cord 42 having projecting ends 52 by means of which the strip is supported by holders at the upper edge of the gate. Each holder comprises a cable socket 54 in which the end of the wire rope 52 is engaged and the eye of the socket is engaged by a bolt 56 which extends through an offset angle plate 58 with a fastening nut 60 engaging a threaded portion of the bolt at the outer side of the offset angle plate 58. The inner end of the angle plate is secured to the upper edge of the gate by bolts 62 or other suitable fastening means.

Between the rear of the seal strip 32 and the inner portion of the U member is a space 64 within which extends a heating conductor 44 covered by insulation 46. The extremities of this conductor may be connected to a suitable source of current (not shown) whereby the space, the U member, and the seal may be heated sufficiently to thaw it if frozen for movement in the U member. The opening 50 forming a continuous passage may also be used for heating purposes by running hot water through it.

Preferably at each lower corner of the gate is a pipe 70 connected through the wall of the U member to a three-way valve 72 with an outlet pipe 74 extending through the gate to the outer or downstream side thereof.

With this construction, when the valve is turned in one position as shown in Fig. 6, water under pressure from the dam is admitted through the valve and pipe 70 to the space 64 at the rear of the U member thereby pressing the seal strip 32 (or 30) outwardly at the open end of the U member and to press it in contact with the inlaid contact strip 28. This will seal the side and bottom edges of the gate projecting the seal strip across the space between the gate and the dam opening. To relieve the pressure of the seal strip, the valve is turned 90° to the position shown in Fig. 5 in which the pipes 70 and 74 are connected through the valve and through the gate 10, thereby connecting the space 64 to the low pressure or downstream side of the dam. Thus the seal strip is held against the wall or abutment by reservoir pressure with the assumption that the force exerted by the strip against the wall opening will compress a narrow area of the strip for about one-third of its width. The opening 50 in the strip 32 encourages flattening and accommodation to any irregularities in the wall surface.

The reservoir or dam pressure is usually sufficient to maintain the desired pressure of the seal strip against the abutment surface to prevent leakage, but the U member may also be closed at the upper end and connected to a water supply line to provide any desired additional head.

If it is found satisfactory to maintain the water level back of the seal strip in the new member at the same as the reservoir level, this may be automatically accomplished by having one or more small holes into the reservoir from the U chamber permitting adjustment to reservoir pressure in this space for each movement of the gate. These holes would be too few and too small to prevent relieving the pressure by the larger valve at the bottom when the gate is to be moved. The U seals may be located on either side of the gate or skin plate. In cold climates, they may be preferable on the water side where they are less likely to freeze. In warm climates, the outer or exposed side would be preferred.

In Fig. 3, is shown a bottom seal for a curve gate 11 which differs very slightly from the side seals. The seal strip may in fact be continuous and identical along the bottom and sides providing a fillet curve at the foot of a wall or pier and a curve in the seal strip may be molded not bent around the fillet. At the bottom of a gate, there is no tendency for the seal strip to move longitudinally, but the side strips may experience some friction against the walls even with the internal pressure relieved. To prevent the consequent tendency of the side strips to stretch or compress and thus become displaced to this extent, the supporting wire cable 42 may be attached at the upper edges of the gate by the end holders therefor, permitting freedom of movement of the seal strip to and from the wall under pressure from within the U member to accommodate irregularities in the wall surface or clearance between the gate and the wall.

This seal may be kept from freezing by circulating warm water into the top of the U member at one end of the gate and allowing it to escape at the other end; or a continuous passage 50 may be provided in the rounded nose of the seal and warm water circulated through this passage from end to end; or an insulated electrical wire 44 may be mounted permanently in the U from end to end and kept electrically heated in cold weather. The depth of the U member and size and shape of the seal strips are made great enough to permit any desired movement inwardly and outwardly in the U member thus permitting accommodation to a pier or wall inlay strip that is far from straight. This avoids some of the great care now exercised to obtain true surfaces because of the lack of accommodation of existing seals.

While preferred constructions have been described in some detail, they should be regarded by way of examples and illustrations rather than as limitations or restrictions of the invention, as various changes in the construction, combination and arrangement of the parts may be made without departing from the spirit and scope of the invention.

I claim:

1. A gate seal for dams and the like, comprising a U-shaped member secured to the sides and bottom of a gate with the open end of the member exposed at the edge of the gate, a seal strip of flexible resilient material fitting transversely in the U member but leaving a closed space in the rear of the member and having one portion projecting beyond the open edge of the U member, and means for applying pressure within the U member in the space at the inner side of the seal strip therein tending to press the strip out at the open edge of the member.

2. A gate seal of the class described, comprising a continuous U strip secured to the side edges and the bottom of the gate with the open edge thereof at the edges and bottom of the gate, a flexible seal strip of plastic resilient material seated within the U member and substantially fitting it in cross section with space in the inner end a portion of the strip extending beyond the outer end of the U member and means to apply pressure within the space in the U member to press the seal strip outwardly from the U member.

3. A gate seal in accordance with claim 2, in which one edge of the U member is bent inwardly to restrain the seal strip from projecting too far outwardly from the open end of the U member.

4. A gate seal in accordance with claim 2, in which the flexible resilient member is continuous from end to end of the seal strip and has a passage in the projecting nose thereof through which a heating liquid may be circulated.

5. A gate seal in accordance with claim 2, in which the portion of the seal strip within the U member has flexible fins at the rear inner edges fitting tightly against the parallel sides of the U member.

6. A gate seal in accordance with claim 3, in which the seal strip has flexible fins at the rear inner edges fitting against the inner parallel sides of the U member and the fins adapted to be resiliently pressed against the inside surface of the U member by fluid pressure applied within the inner end of the U member.

7. A gate seal structure in accordance with claim 2, in which a supporting cable extends throughout the length of the seal strip, and means at the upper ends of the gate for engaging and supporting the upper protruding ends of the cable.

8. A gate seal in accordance with claim 2, and an electrical resistance mounted in a space at the back of the seal strip within the U member for heating the seal strip.

9. A gate seal in accordance with claim 3, including valve means communicating with the interior of the U-shaped member, the interior of the gate at the pressure side and the exterior of the gate at the downstream side to apply and relieve pressure within the U member.

10. A gate seal for dams and the like comprising a skin plate, in combination with means forming an open continuous channel at the sides and bottom of the skin plate, a seal strip of flexible resilient material fitting in the outer open edge of the channel leaving a continuous space back of the strip within the channel, and means for applying pressure to the space within the channel tending to force the strip out at the open edge.

11. A gate seal in accordance with claim 10, in which the outer edge of the channel is restricted to restrain the seal strip within the channel.

12. A gate seal in accordance with claim 11 in which heating means is included in the space within the channel.

References Cited in the file of this patent

UNITED STATES PATENTS

| Number | Name | Date |
|---|---|---|
| 1,082,291 | Tainter | Dec. 23, 1913 |
| 1,750,901 | Newell | Mar. 18, 1930 |
| 1,989,701 | Zimmermann | Jan. 1, 1935 |
| 2,240,049 | Murphy | Apr. 29, 1941 |

FOREIGN PATENTS

| Number | Country | Date |
|---|---|---|
| 409,898 | Great Britain | of 1934 |